United States Patent
Levin et al.

(10) Patent No.: US 9,881,079 B2
(45) Date of Patent: Jan. 30, 2018

(54) QUANTIFICATION BASED CLASSIFIER

(71) Applicant: International Business Machines Corporation, Armonk, NY (US)

(72) Inventors: Roy Levin, Zihron Yakov (IL); Haggai Roitman, Yoneam Elit (IL)

(73) Assignee: International Business Machines Corporation, Armonk, NY (US)

(*) Notice: Subject to any disclaimer, the term of this patent is extended or adjusted under 35 U.S.C. 154(b) by 472 days.

(21) Appl. No.: 14/582,204

(22) Filed: Dec. 24, 2014

(65) Prior Publication Data

US 2016/0188711 A1    Jun. 30, 2016

(51) Int. Cl.
G06F 7/00    (2006.01)
G06F 17/30    (2006.01)

(52) U.S. Cl.
CPC .............. *G06F 17/30707* (2013.01)

(58) Field of Classification Search
None
See application file for complete search history.

(56) References Cited

U.S. PATENT DOCUMENTS

| | | | |
|---|---|---|---|
| 6,621,930 B1* | 9/2003 | Smadja ............ | G06F 17/30707 358/403 |
| 7,987,144 B1* | 7/2011 | Drissi .................. | G06N 99/005 706/20 |
| 8,897,563 B1* | 11/2014 | Welling ............ | G06K 9/00442 382/173 |
| 9,367,814 B1* | 6/2016 | Lewis ................. | G06N 99/005 |
| 9,436,919 B2* | 9/2016 | Sun ...................... | G06Q 10/101 |
| 2008/0065633 A1 | 3/2008 | Luo et al. | |
| 2011/0302111 A1 | 12/2011 | Childlovskii | |
| 2013/0198193 A1* | 8/2013 | Chitiveli .......... | G06F 17/30707 707/740 |

OTHER PUBLICATIONS

Lei Tang et al., "Large Scale Multi-Label Classification via MetaLabeler", ACM, Proceedings of the 18th international conference on World Wide Web pp. 211-220 , Apr. 20-24, 2009.
Mohammad S Sorower., "A literature survey on algorithms for multi-label learning", pp. 1-25, 2010.
Grigorios Tsoumakas., "Multi-label classification: An overview", International Journal of Data Warehousing & Mining, vol. 3(3), pp. 1-13, Jul.-Sep. 2007.

* cited by examiner

*Primary Examiner* — Uyen Le
(74) *Attorney, Agent, or Firm* — Daniel Klugler

(57) ABSTRACT

Methods, computing systems and computer program products implement embodiments of the present invention that include selecting a dataset that includes instances, each of the instances having respective features, and determining an expected distribution of the instances among multiple categories. A first classification is generated that includes, for each of the instances based on their respective features, one or more first categories and a corresponding confidence score for each of the one or more categories. One or more of the instances classified into the given category are allocated to each given category, based on their respective confidence scores, using the allocated one or more instances, a second classification is generated.

12 Claims, 4 Drawing Sheets

QUANTIFICATION BASED CLASSIFIER

CROSS-REFERENCE TO RELATED APPLICATION

This application is related to U.S. Patent Application titled "Dataset Classification Quantification" filed on even date with the present application, and which is incorporated herein by reference.

FIELD OF THE INVENTION

The present invention relates generally to producing classifications from datasets, and specifically to producing accurate classification quantifications from datasets.

BACKGROUND

Classification (also known as categorization) comprises assigning a given data element of a dataset to one or more classes or categories. Classification types include single-label classification and multi-label classification. In a multi-label classification, each data element can have multiple features that are each assigned respective predefined labels (i.e., categories), and in a single-label classification, each dataset data element is assigned a single label. Classification can be used to categorize one or more data set elements such as text documents, wherein each of the documents can be assigned to multiple categories (e.g., a newspaper article can be related to both finance and technology).

The description above is presented as a general overview of related art in this field and should not be construed as an admission that any of the information it contains constitutes prior art against the present patent application.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY

There is provided, in accordance with an embodiment of the present invention a method, including selecting a dataset including instances, each of the instances having respective features, determining an expected distribution of the instances among multiple categories, generating a first classification including, for each of the instances based on their respective features, one or more first categories and a corresponding confidence score for each of the one or more categories, allocating, to each given category, one or more of the instances classified into the given category based on their respective confidence scores, and generating, using the allocated one or more instances, a second classification.

There is also provided, in accordance with an embodiment of the present invention an apparatus, including a memory configured to store a dataset including instances, each of the instances having respective features, and a processor configured to select the dataset, to determine an expected distribution of the instances among multiple categories, to generate a first classification including, for each of the instances based on their respective features, that classifies, to each of the instances based on their respective features, one or more first categories and a respective corresponding confidence score for each of the one or more categories, to allocate, to each given category, one or more of the instances classified into the given category based on their respective confidence scores, and to generate, using the allocated one or more instances, a second classification having a classification distribution in accordance with the expected distribution.

There is further provided, in accordance with an embodiment of the present invention a computer program product, the computer program product including a non-transitory computer readable storage medium having computer readable program code embodied therewith, the computer readable program code including computer readable program code configured to select a dataset including instances, each of the instances having respective features, computer readable program code configured to determine an expected distribution of the instances among multiple categories, computer readable program code configured to generate a first classification including, for each of the instances based on their respective features, one or more first categories and a corresponding confidence score for each of the one or more categories, computer readable program code configured to allocate, to each given category, one or more of the instances classified into the given category based on their respective confidence scores, and computer readable program code configured to generate, using the one or more allocated instances, a second classification having a classification distribution in accordance with the expected distribution.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Classifiers are software applications used to classify elements of a dataset into multiple categories. In embodiments described herein, classifying elements of a dataset into multiple categories comprises associating each of the elements with a given category. However, when classifying a dataset into multiple categories, a given classifier may overclassify or underclassify some of the categories. In overclassification, the classifier assigns too many dataset elements to a given category, and in underclassification the classifier assigns too few dataset elements to a given category.

Embodiments of the present invention provide methods and systems for performing a quantification based classification of a dataset. As described hereinbelow, upon selecting a dataset comprising instances having respective features, an expected distribution of the instances among multiple categories can be determined. An initial classification (also referred to herein as a first classification) comprising, for each of the instances based on their respective features, one or more first categories and a corresponding confidence score for each of the one or more categories.

One or more of the instances classified into the given category are allocated to each given category based on their respective confidence scores, and using the allocated instances, a final classification (also referred to herein as a second classification) is generated that classifies each of the one or more instances into a given category. By using confidence scores to assign the instances to their respective categories, a classification distribution (i.e., a distribution of the instances among the categories) of the final classification is typically in accordance with the expected distribution. Therefore, when classifying a dataset comprising multiple dataset elements, systems incorporating embodiments of the present invention can improve the accuracy of classifications.

System Description

Figure 1A:
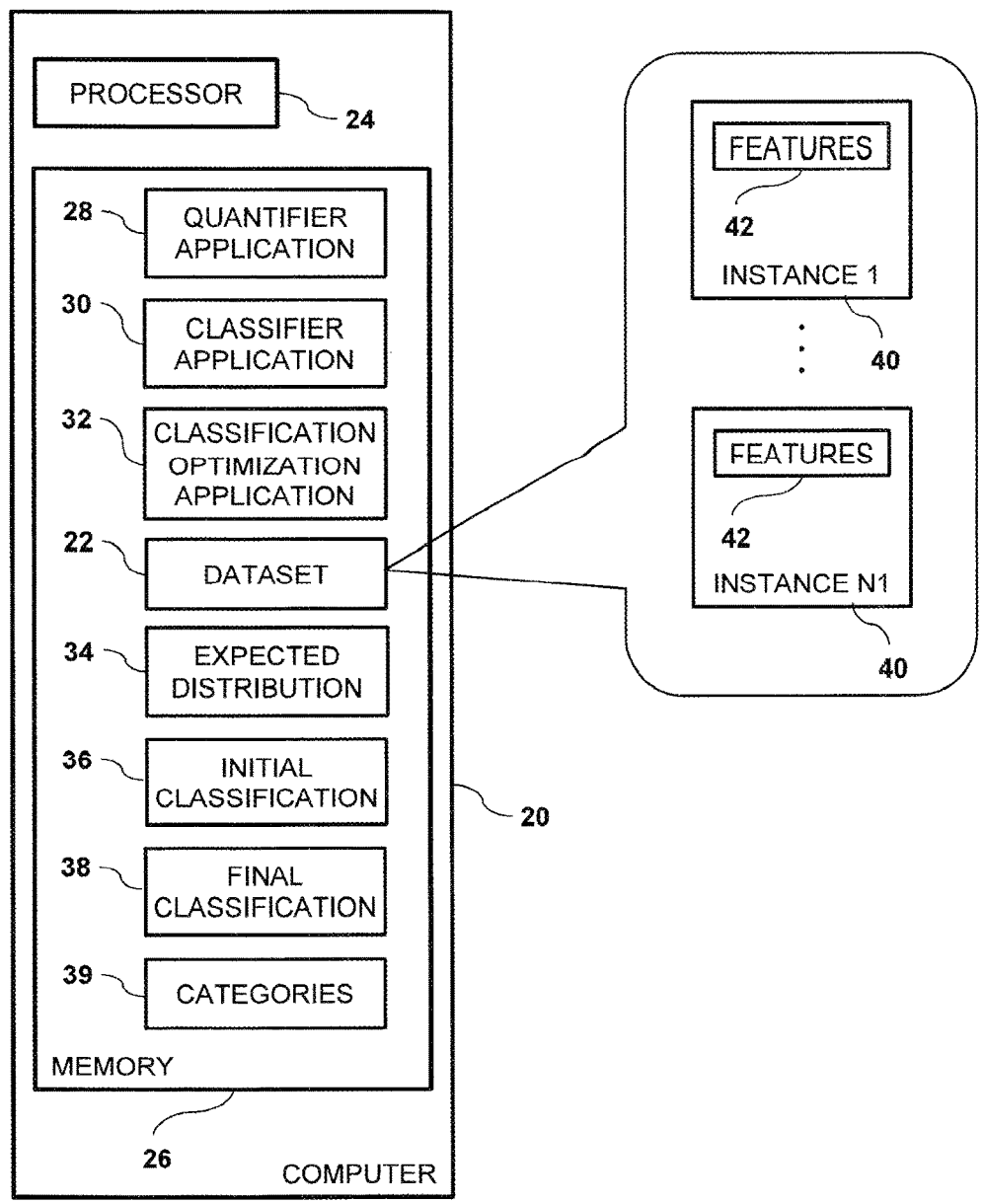
FIGS. 1A and 1B are block diagrams of a computer system configured to perform a quantification based classification on a dataset, in accordance with an embodiment of the present invention.
Figure 1B:
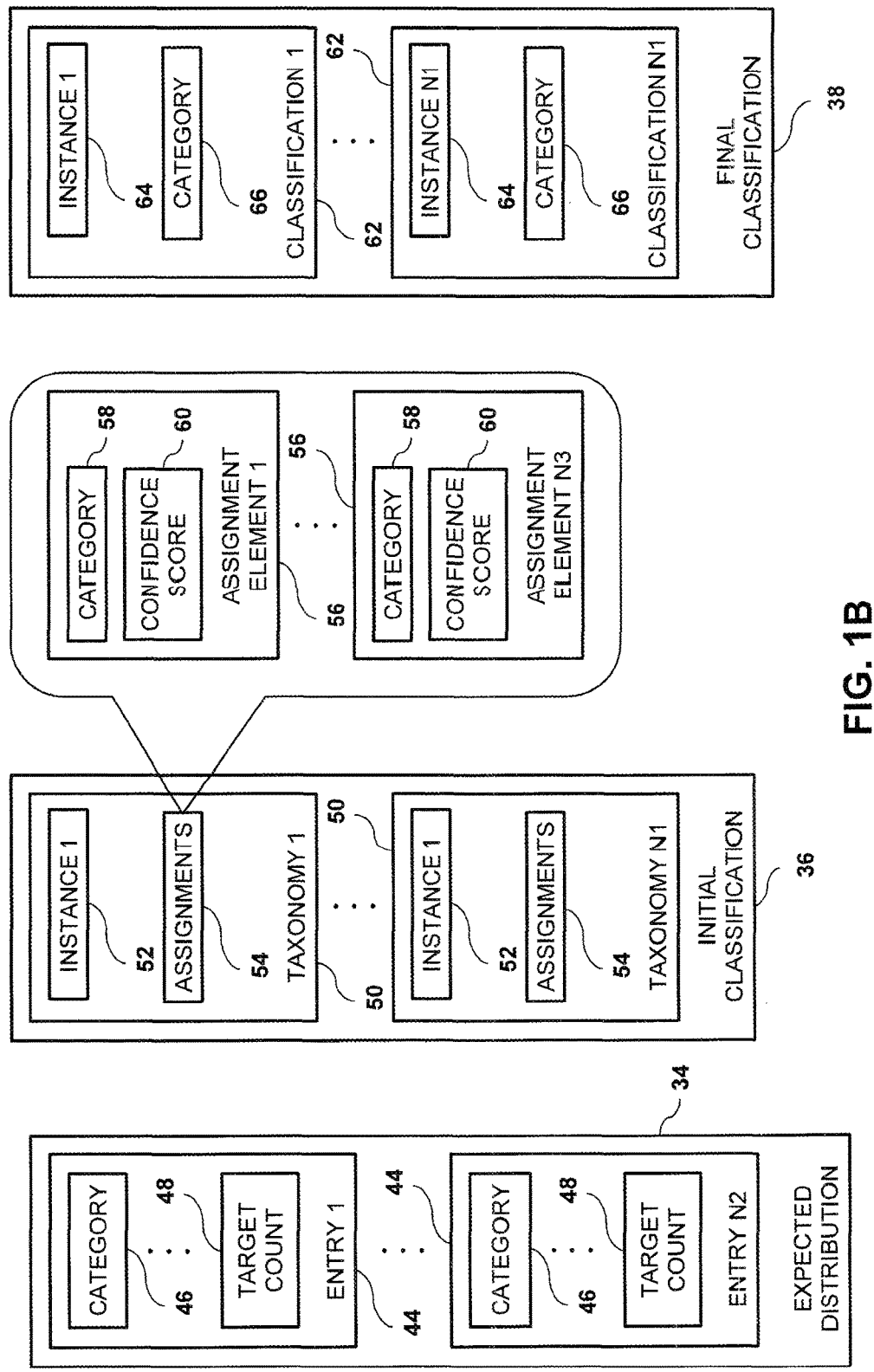

FIGS. 1A and 1B, referred to collectively as FIG. 1, are block diagrams of a computer system 20 configured to perform a quantification based classification of a dataset 22, in accordance with an embodiment of the present invention. Computer 20 comprises a processor 24 and a memory 26. In addition to dataset 22, memory 26 stores a quantifier application 28, a classifier application 30, a classification optimizing application 32, an expected distribution 34, an initial classification 36, a final classification 38, and categories 39.

Dataset 22 comprises dataset instances 40, each of the instances comprising one or more features 42. For example, if dataset instances 40 comprise books and publications, categories comprise the category labels such as "science fiction", "biography", and "espionage" from a set of categories. Using dataset 22, processor 24 can execute quantifier application 28 in order to generate expected distribution 34, and execute classifier application 30 to generate initial classification 36.

Processor 24 can apply quantifier application 28 to dataset in order to generate expected distribution 34. Expected distribution 34 comprises multiple entries 44, each of the entries comprising a target category 46 and a target count 48, the target category comprising a given category 39. Examples of quantifier application 28 include but are not limited to, calibration matrix based quantifiers, scaling based quantifiers and statistical quantifiers. Scaling based quantifiers apply mathematical functions to a given initial classification 36 based on the given initial classification and expected distribution 34, and statistical quantifiers use prior probabilities for each instance 52 in order to a probabilistic assignment of the initial instances. Calibration matrix based quantifiers are described in more detail in U.S. patent application "Dataset Classification Quantification", referenced above.

In embodiments of the present invention, processor 24 can apply classifier application 30 to dataset 22 in order to generate initial classification 36. Initial classification 36 comprises multiple taxonomies 50, each of the taxonomies comprising an initial instance 52 and assignments 54, wherein each of the initial instances comprises a given dataset instance 40. Assignments 54 comprise one or more assignment elements 56, each of the assignment elements comprising an initial category and a confidence score 60, wherein the initial category comprises a given category 39. When generating initial classification 36, classifier application 30 can assign multiple possible initial categories 58 to initial instance 52, each of the initial categories having a corresponding confidence score 60.

As described hereinbelow, classification optimization application 32 uses expected distribution 34 and initial classification 36 in order to generate final classification 38. Final classification 38 comprises multiple classifications 62, each of the classifications comprising a final instance 64 and a final category 66, wherein each of the final instances comprises a given dataset instance 40 and each of the final categories comprises a given category 39.

Processor 24 typically comprises a general-purpose computer, which is programmed in software to carry out the functions described herein. The software may be downloaded to computer 20 in electronic form, over a network, for example, or it may be provided on non-transitory tangible media, such as optical, magnetic or electronic memory media. Alternatively, some or all of the functions of processor 24 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Implementing Classification Quantification

Figure 2:
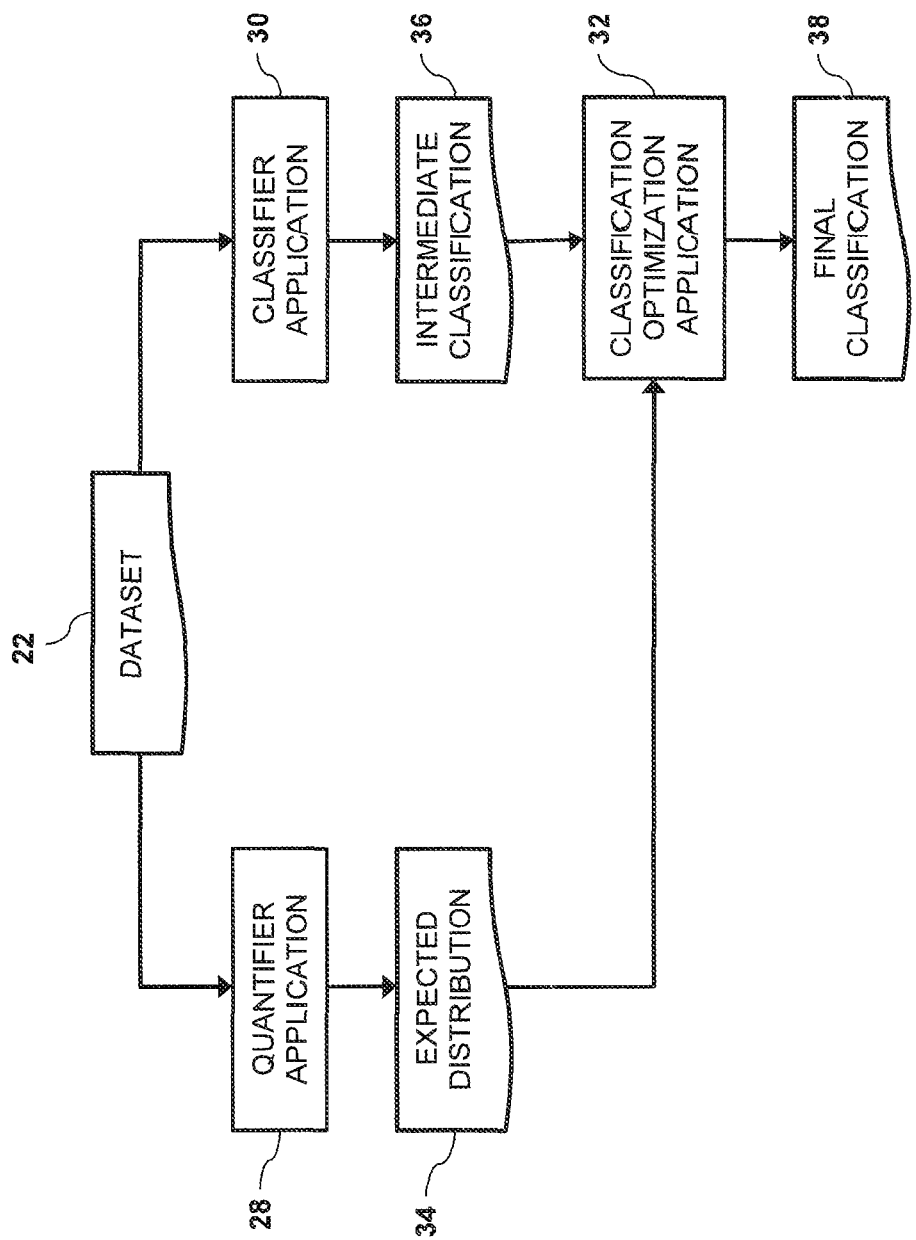
FIG. 2 is a flow diagram that schematically illustrates components of the computer system performing the quantification based classification, in accordance with an embodiment of the present invention.

FIG. 2 is a flow diagram that schematically illustrates components of computer system 20 that perform quantification based classification, in accordance with an embodiment of the present invention. As shown in the flow diagram, dataset 22 is input into both quantifier application 28 and classifier application 30. Using dataset 22, quantifier application 28 generates expected distribution 34 which is input into classification optimization application 32. Using dataset 22, classifier application 30 generates initial classification 36. Finally, using expected distribution 34 and initial classification 36, classification optimization application 32 generates final classification 38.

Figure 3:
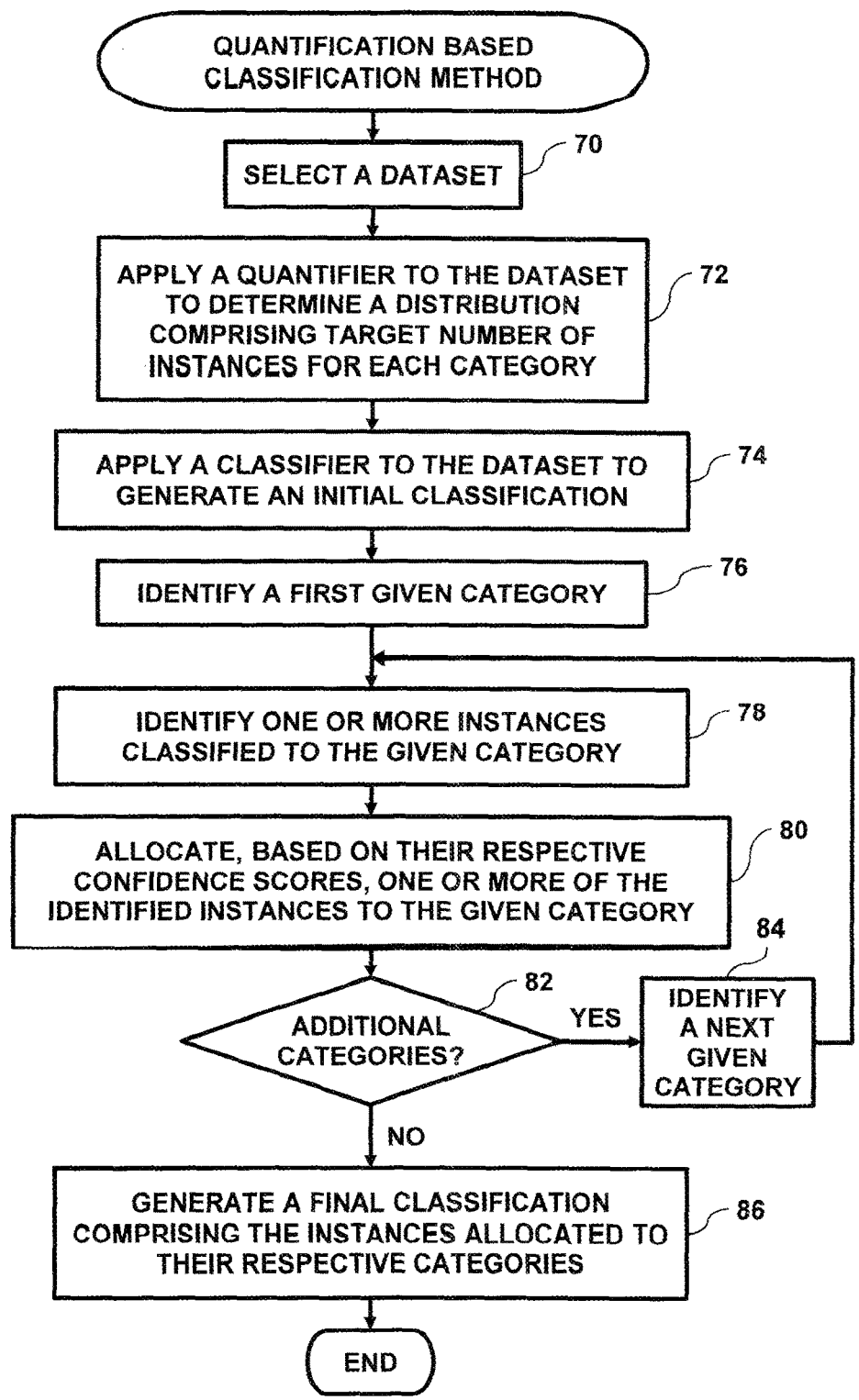
FIG. 3 is a flow diagram that schematically illustrates a method of performing the quantification based classification, in accordance an embodiment of the present invention.

FIG. 3 is a flow diagram that schematically illustrates a method performing a quantification based classification for production dataset 22, in accordance with an embodiment of the present invention. In a selection step 70, processor 24 selects dataset 22, and in a first application step 72, the processor applies quantifier application 28 to the dataset, thereby generating expected distribution 34 that comprises target categories 46 and a respective target count 48 for each of the target categories. Typically, dataset 22 is an "unseen" dataset that has never been processed by computer 20.

In a second application step 74, processor 24 applies classifier application 30 to dataset 22, thereby generating initial classification 36. In initial classification 36, processor 24 classifies, each initial instance, based on their respective features 42, into one or more initial categories 58, each classification comprising a given initial category 58 and a given confidence score 60 that are stored in a given assignment element 56, as shown in FIG. 1A.

In a first identification step 76, processor 24 accesses the first entry 44 in expected distribution 34, thereby identifying a given target category 46, and in a second identification step 78, processor 24 identifies one or more initial instances 52 in initial classification 36 whose respective initial category 58 matches the given target category 46. In other words, processor 24 identifies one or more initial instances 52 classified into the given target category.

In an allocation step 80, classification optimization application 32 allocates, to the given target category, one or more dataset instances 40. In embodiments of the present invention, classification optimization application 32 can select the one or more instances to be allocated to the given target category based on their respective confidence scores 60. As shown in FIG. 1, expected distribution 34 comprises target counts 48 (i.e., a count of instances 64 assigned to the target category) for each target category 52. In some embodiments, classification optimization application 32 can select the one or more instances 64 by assigning, to each given target category 46, the respective target number of dataset instances 52 classified into the given category and whose respective confidence scores 60 are highest among all of the instances assigned to the given category. In embodiments of the present invention, the target number of data instances 52 is based on the expected distribution generated by quantifier application 28. Therefore, a distribution of final instances 64 among final categories 66 typically closely matches expected distribution 34.

In some embodiments, given a set of instances $D=\{i_1, i_2, \ldots, i_n\}$ (i.e., an example of instances 40), and a quantifier application 28 which is configured to map dataset $D$ and a label $l_r$ to the number of labels of that type, i.e., $c(D, l_r)$, classification optimizing application 32 can create, for each label $l_r$, a set of top-k scores $s(i'_1, l_r), s(i'_2, l_r), \ldots, s(i'_k, l_r)$ as given by the classifier application 30, where $k=c(D, l_r)$ and $i'_j$ is in the top-k scores. Classification optimizing application 32 can then annotate the instances $i'_1, i'_2, \ldots, i'_k$ with the label $l_r$ based on the previous step of creating a set of top-k scores for each label $l_r$.

Returning to the flow diagram, in a comparison step 82, if there are any additional entries 44 having respective target categories 46 in expected distribution 34, then in a second access step 84, processor 24 accesses the next entry 44 in the expected distribution and the method continues with step 78. Upon accessing the next entry in the expected distribution, the given target category 46 now comprises the target category in the accessed entry 44. If there are no additional entries 44 having respective target categories 46 in expected distribution 34, then in a generation step 86, processor 24 generates final classification 38 comprising dataset instances 40 allocated to their respective target categories 46 (i.e., in step 80), and the method ends.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   receiving, by a processor, a dataset comprising instances, each of the instances having respective features;
   determining, by a quantifier application, an expected distribution of the instances of the received dataset among multiple categories, the expected distribution comprising respective target numbers of instances for each of the categories;
   generating a first classification comprising, for each of the instances based on their respective features, one or more first categories to which the instance may be classified and a corresponding confidence score indicating a confidence that the instance is to be classified to the category;
   selecting a number of instances to be classified in each category, responsive to the expected distribution of the instances of the received dataset, determined by the quantifier;
   allocating, to each given category, the respective target number of instances classified into the given category and whose respective confidence scores are highest among all of the instances assigned to the given category; and
   generating, using the allocated respective target numbers of instances, a second classification.

2. The method according to claim 1, wherein generating the first classification comprises applying a classification application to the dataset.

3. The method according to claim 1, wherein the quantifier is selected from a list consisting of a calibration matrix based quantifier, a scaling based quantifier and a statistical quantifier.

4. The method according to claim 1, wherein the second classification has a classification distribution in accordance with the expected distribution.

5. An apparatus, comprising:
   a memory configured to store a dataset comprising instances, each of the instances having respective features; and
   a processor configured:
      to receive the dataset
      to determine, by a quantifier application, an expected distribution of the instances of the received dataset among multiple categories, the expected distribution comprising respective target numbers of instances for each of the categories,
      to generate a first classification comprising, for each of the instances based on their respective features, that classifies, to each of the instances based on their respective features, one or more first categories to which the instance may be classified and a corresponding confidence score indicating a confidence that the instance is to be classified to the category,
      to select a number of instances to be classified in each category, responsive to the expected distribution of the instances of the received dataset, determined by the quantifier,
      to allocate, to each given category, the respective target number of instances classified into the given category and whose respective confidence scores are highest among all of the instances assigned to the given category, and
      to generate, using the allocated respective target numbers of instances, a second classification.

6. The apparatus according to claim 5, wherein the processor is configured to generate the first classification by applying a classification application to the dataset.

7. The apparatus according to claim 5, wherein the quantifier is selected from a list consisting of a calibration matrix based quantifier, a scaling based quantifier and a statistical quantifier.

8. The apparatus according to claim 5, wherein the second classification has a classification distribution in accordance with the expected distribution.

9. A computer program product, the computer program product comprising:
   a non-transitory computer readable storage medium having computer readable program code embodied therewith, the computer readable program code comprising:
   computer readable program code configured to receive a dataset comprising instances, each of the instances having respective features;
   computer readable program code configured to determine, by a quantifier application, an expected distribution of the instances of the received dataset among multiple categories, the expected distribution comprising respective target numbers of instances for each of the categories;
   computer readable program code configured to generate a first classification comprising, for each of the instances based on their respective features, one or more first categories to which the instance may be classified and a corresponding confidence score indicating a confidence that the instance is to be classified to the category;

computer readable program code configured to select a number of instances to be classified in each category, responsive to the expected distribution of the instances of the received dataset, determined by the quantifier;

computer readable program code configured to allocate, to each given category, the respective target number of instances classified into the given category and whose respective confidence scores are highest among all of the instances assigned to the given category; and computer readable program code configured to generate, using the allocated respective target numbers of instances, a second classification.

10. The computer program product according to claim 9, wherein the computer readable program code is configured to generate the first classification by applying a classification application to the dataset.

11. The computer program product according to claim 9, wherein the quantifier is selected from a list consisting of a calibration matrix based quantifier, a scaling based quantifier and a statistical quantifier.

12. The computer program product according to claim 9, wherein the second classification has a classification distribution in accordance with the expected distribution.

* * * * *